Figure 2:
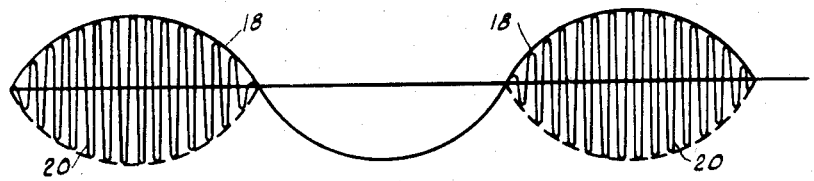

July 1, 1930.  N. P. HINTON  1,768,688
ELECTRICAL PROTECTIVE SYSTEM
Filed Dec. 8, 1925   2 Sheets-Sheet 1
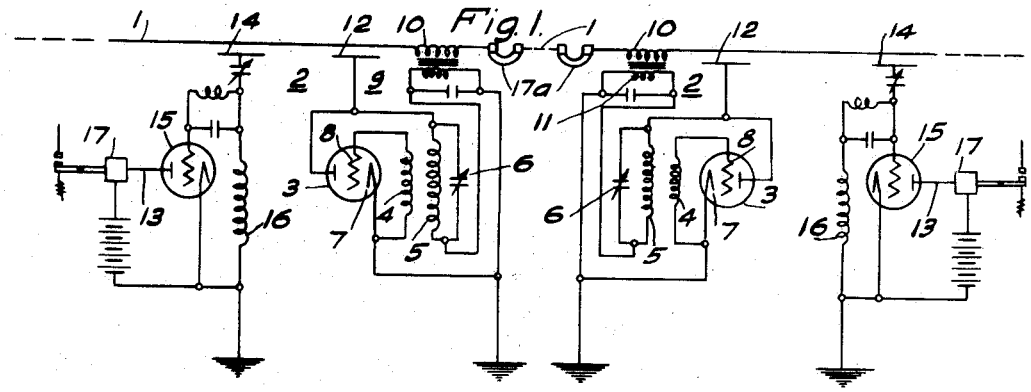
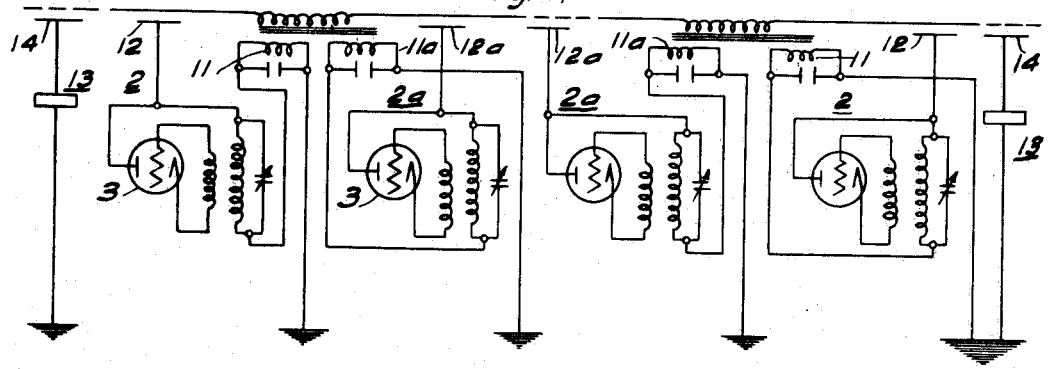
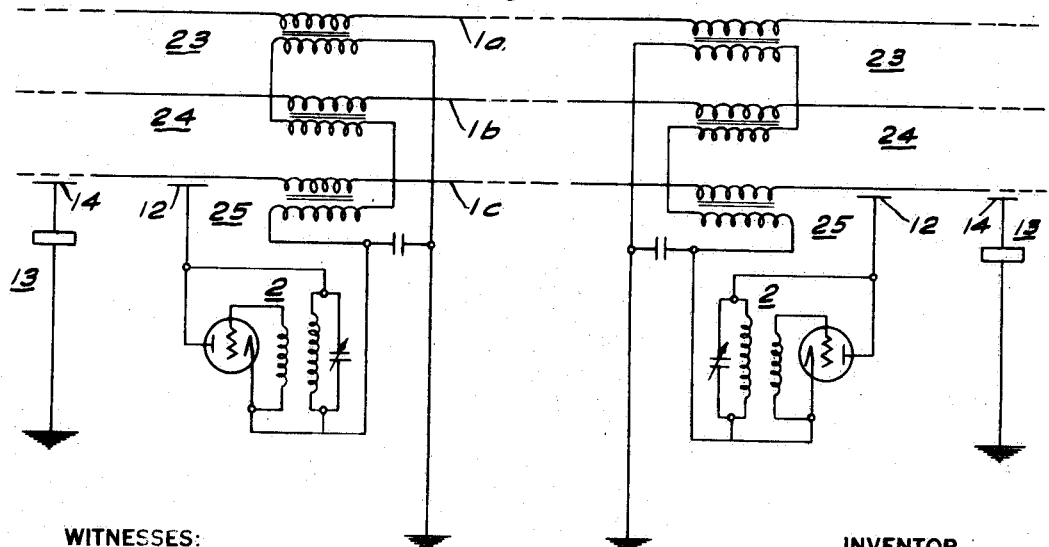
WITNESSES:
INVENTOR
Norman P. Hinton.
BY
ATTORNEY Patented July 1, 1930

1,768,688

UNITED STATES PATENT OFFICE

NORMAN PULLEN HINTON, OF TIMPERLEY, ENGLAND, ASSIGNOR TO WESTINGHOUSE ELECTRIC & MANUFACTURING COMPANY, A CORPORATION OF PENNSYLVANIA

ELECTRICAL PROTECTIVE SYSTEM

Application filed December 8, 1925, Serial No. 74,216, and in Great Britain December 9, 1924.

My invention relates to protective arrangements for electrical systems and in particular to protective arrangements wherein alternating currents of frequencies different from and usually higher than that of the power system to be protected are superimposed on the current in the distribution circuits of the latter and arranged to operate protective gear upon the occurrence of faults.

A protective arrangement of this type involves the use of sources of alternating current controlled by variations or disturbances from normal conditions in the distribution circuits and a device arranged to respond to said sources and to operate protective gear upon the occurrence of such variations or disturbances. In its preferred form, the arrangement embodies the use of two sources of alternating current of different frequencies provided one at each end of the distribution circuits and controlled by variations or disturbances from normal conditions in the circuits, and one or more devices responsive to the changes in the beat frequency which obtain upon the occurrence of such variations or disturbances for operating the protective gear.

According to the present invention, in a protective arrangement for an alternating-current system, two or more auxiliary sources of alternating current are respectively so controlled by the alternations of line current flowing in the ends of the section of line to be protected as to periodically supply oscillations of predetermined different frequencies which co-operate to produce a beat frequency for time intervals which depend upon the phase relationship of the line currents at the ends of the line section, which is utilized for controlling the operation of a relay tuned or responsive only to the beat frequency and adapted to effect the operation of protective gear for the section upon the occurrence of a fault which affects the phase relationship of the line currents and thereby the character of the beat frequency.

Thus the invention involves the use of a pair of oscillation generators for supplying superimposed high-frequency currents, means controlled by the alternations of the line current either for operatively connecting the generators so that the two superimposed currents are supplied periodically in accordance with predetermined half cycles of line current, or for rendering the two generators alternately active and inactive, or for periodically varying the frequency thereof, and one or more relays or similar devices responsive to the beat frequency. Such relay can be arranged to control the operation of the protective gear upon establishment of, change in, or failure of the beat frequency consequent upon a relative change in the periods during which the two superimposed currents of predetermined different frequencies are supplied.

Thus in the case of a relative shifting in phase of the line currents at the respective ends of the section occasioned, for instance by a ground on the system or other fault, there will be a corresponding relative change in the periods of time during which the superimposed currents are supplied, whereby the necessary condition is obtained to which the relay is responsive.

To enable the invention to be clearly understood, arrangements thereof both for single-phase and three-phase systems, and their operation will now be described by way of example with reference to the accompanying drawings, in which Fig. 1 is an electrical diagram of a single phase system embodying the invention;

Figs. 2 to 7, inclusive, are diagrams illustrating the relationship of the line currents and superimposed currents in the arrangements shown in Fig. 1 during normal and fault conditions;

Fig. 8 is a diagram illustrating a modification of the arrangement shown in Fig. 1, wherein the quiescent periods of the beat frequency are eliminated; and Fig. 9 is a diagram of a protective arrangement for a 3-phase distribution system.

In Fig. 1, a distribution circuit 1 to be protected is provided with two oscillation generators 2, one at each end of the circuit 1. Each generator comprises a three-electrode evacuated valve 3, preferably of the thermionic type, a grid inductance 4 and an anode inductance 5, inductively coupled to the inductance 4. The anode circuit may be tuned by means of a variable condenser 6 to the desired frequency, and the grid and anode circuits are magnetically coupled together in such a manner that the valve 3 generates continuous oscillations in the well-known manner. The cathodes 7 of the valves 3 may be supplied with energy from the section 1 or from an independent source, the connections being omitted for the sake of simplicity in illustration.

The supply of energy for the anode circuit is obtained, as shown, from the distribution circuit 1 through a transformer 9, the primary winding 10 of which is connected in series with the line and the secondary winding 11 connected at one end to the cathode 7 and at the other end to the oscillatory circuits 5, 6.

The alternating current generated by the valve 3 is transmitted to the section 1 of the distribution circuit through a capacity coupling 12, or in any other desired manner so as to be superimposed on the line current. The two oscillation generators at the ends of the section of line to be protected are adjusted to generate alternating currents of predetermined different frequencies. For example, the left-hand oscillation generator may generate a current having a frequency of 15,000 cycles per second and the right hand oscillation generator, a current having a frequency of 14,000 cycles per second. It will be appreciated that since the anode circuits of the valves are supplied with alternating current from the section 1 of the line to be protected, the superimposed currents are generated periodically, namely, during the positive half-cycles of the line current. The oscillation generators are inactive during the negative half-cycles of the line current, since then the anodes 8 are at a negative potential with respect to the cathodes 7.

The invention is not limited, however, to the particular arrangement described in which the valves 3 are caused to supply alternating current periodically in accordance with the frequency of the line current.

With the arrangement shown in Fig. 1, the two superimposed currents which flow in the section of line to be protected during each positive half-cycle of line current produce a beat frequency which, in the example mentioned, is 1,000 cycles per second.

On long lines, there will be a slight difference of phase in anode supply to the oscillation generators at each end of the section on account of capacity current in the line, especially on light loads. This effect can be compensated for in any desired manner, as by using, for instance, auxiliary windings on the transformers at one or both ends of the section, fed with current in quadrature with the voltage from line to ground.

At one or each end of the section 1 there is provided electro-responsive means 13 which may also have a capacity coupling 14 with the distribution circuit, and which is preferably tuned or arranged to be equally responsive to both of the oscillation generators. It may, for example, embody a device or circuit tuned to the frequency of the generator at the opposite end of the circuit.

The electro-responsive means 13 comprises a three-electrode thermionic valve 15 having a tuned grid circuit 16 and arranged to rectify or detect the oscillations received in its grid circuit 16. In the anode circuit of the valve 15 is connected a relay 17 which is tuned mechanically or electrically to the beat frequency and arranged to be maintained in its inoperative position so long as the beat frequency persists, or, in other words, so long as the two oscillation generators 2 operate simultaneously. When however the beat frequency ceases or changes, the relay operates and moves to its other position for controlling the operation of the protective gear, such as the circuit-interrupters 17a.

The condition of simultaneous generation by the two oscillation generators will be maintained so long as normal conditions obtain in the line to be protected; that is to say, when the currents in the respective ends of the section are substantially in phase. However, upon the occurrence of a fault within the section, the currents at the ends thereof will no longer be substantially in phase and may be nearly 180 degrees out of phase, depending upon the severity of the fault. In the case of a complete ground fault within the section, the current at one end thereof will reverse, since current will flow to ground from both ends thereof assuming, of course, that the section forms part of a network and can be supplied current from both ends. Under these conditions one of the oscillation generators will continue to oscillate during the same positive half-cycles of the line current as previously, but the other will continue to oscillate during the half-cycles which are out of phase therewith, so that the two superimposed alternating currents of different frequencies will be more or less alternately and not simultaneously supplied to the line. The beat note therefore fails wholly or for the greater part and the protective relay 17 operates.

Figure 3:
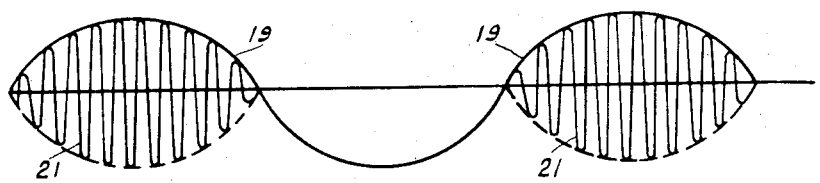
Figure 4:
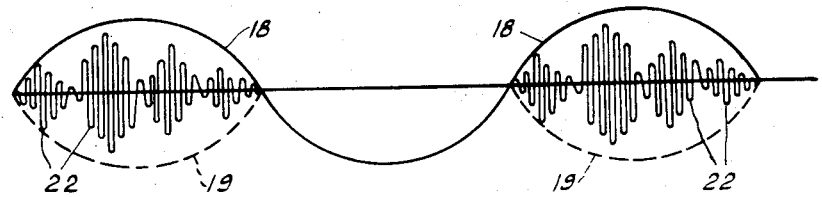
Figure 5:
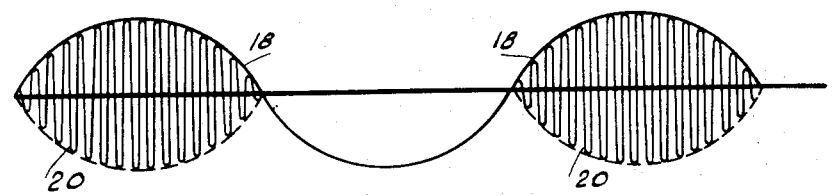

The operation is illustrated in a simple manner in the current diagrams of Figs. 2 to 7 inclusive. In Figs. 2, 4, 5 and 7, the curve 18 represents the current flowing in the line at the left-hand end of the line section. In Figs. 3, 4, 6 and 7, the curve 19 represents the current flowing in the right-hand end of the section. In Figs. 2, 3 and 4, the line current is assumed to be exactly in phase at the two ends of the section, so that during the positive half-cycles of the line current, the valves 3 will oscillate and supply currents of different frequencies periodically and simultaneously to the two ends of the line as arbitrarily represented by the curves 20 and 21, the curve 20 representing (not to scale) a frequency for example of 15,000 per second while the curve 21 represents a frequency of 14,000 cycles per second. The superimposed currents 20 and 21 periodically produce a beat frequency as shown at 22 in Fig. 4, the beats of course only arising during the positive half-cycles of the line current as previously stated.

Figure 6:
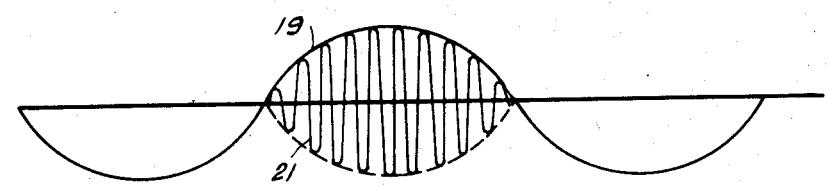
Figure 7:
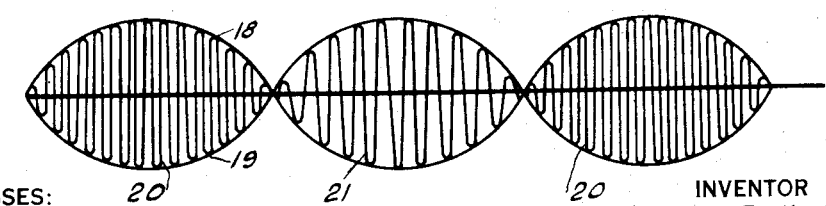

If now a fault occurs within the section, the alternating current 20 generated by the left-hand generator is still supplied to the line during the positive half-cycles and in the same time periods as before. The current 21 generated by the other generator will be supplied to the line during the positive half-cycles of the line current at the remote end of the line, as shown in Fig. 6. However, owing to the fault, the current at the remote end of the line will be nearly 180 degrees out of phase with that flowing in the left-hand end of the line as a result of current flowing to the fault from both ends of the section. Since now the two generators supply current to the line alternately, and not simultaneously, as shown in Fig. 7, there will be no beat frequency and the relay 17 will be operatively controlled.

In the arrangement above described, it will be recalled that during normal conditions there is a quiescent period in the oscillations during the alternate half-cycles of the line current. For a line current of 50 cycles per second, there will be a quiescent period of one-hundredth of a second occurring every one-hundredth of a second. The tuned protective relay may be given such inherent time delay or inertia lag that it will be maintained in its energized or non-operative condition during these quiescent periods, but will operate the protective gear when the beat periods are reduced.

The system may be so modified, however, that oscillations are supplied to the line in such manner that there will be no quiescent periods. As shown in Fig. 8, a pair of oscillation generators 2 and 2a may be provided at each end of the section to be protected, the generators of each pair being supplied with anode currents which are respectively 180° out of phase with one another, either by means of two transformers or a single transformer having two secondary windings 11 and 11a, as shown. Each pair of generators will thus generate and supply oscillations to the line during every half-cycle so that there will be no quiescent periods. The four oscillation generators will preferably be arranged to generate at four different frequencies, which will be so chosen that the beat frequency from each of the two oscillation generators which are oscillating simultaneously at opposite ends of the section will be the same, so that a single relay at either or each end of the section may be employed in the manner previously described. Furthermore, the frequencies will preferably be so chosen that the beat frequency between any other combination of two generators will be different from the beat frequency to which the relays are tuned. With this arrangement, beat frequencies will be continuously supplied to the line and upon the occurrence of a fault in the section, a shifting in phase in the anode supply at one end of the section resulting from the fault will cause the beat note to be changed or reduced or destroyed.

For the protection of a three-phase line, an oscillator 2 at each end of the section is arranged, as shown in Fig. 9, to receive an arbitrary or representative anode potential which may be obtained from all three phases $1^a$, $1^b$, $1^c$, by any suitable means, such as three line-current transformers 23, 24, 25, the secondary windings of which are connected in series and one of which is connected reversed in phase. There will thus be resultant voltages applied as arbitrary anode potentials to the two oscillation generators 2 which will generate synchronously at their respective frequencies during the positive half-cycles of this representative potential, the arrangement being thus equivalent to that described in connection with the single-phase circuit. A receiver 13 having a tuned relay is provided as before at one or each end of the section to be protected.

Under normal conditions, therefore, the tuned relay 13 will respond to the beat frequency during the positive half-cycles of said representative potential. If, however, a fault occurs in that phase conductor of the line from which the phase reversal in the anode circuit of the valves is obtained, there will be a shifting in phase in the supply to one of the anode circuits since the previously obtaining resultant potential will be more or less altered by the counter-phase voltage resulting from the fault current in that particular phase conductor of the section. Consequently, the beat frequency will fail and the protective gear will be operated.

If a fault within the section occurs on either of the other two phase conductors of the system, there will be a change in the phase of the anode supply of one of the oscillation generators accompanied possibly by a small simultaneous change of phase in the anode supply to both generators. By reason of such relative shifting in phase, the beat note will be affected and the protective gear will operate.

In the event of any two of the phase conductors being short-circuited, the phase of one of the anode supplies will be considerably changed relative to the other with a probable change in phase of the anode supplies of both of the oscillators. Consequently the beat frequency will be affected and the protective gear will operate.

Under certain conditions and with certain kinds of faults, there will not be a phase displacement between the arbitrary or representative currents at the two ends of the section but protection may then be obtained by using in a manner somewhat similar to that shown in Fig. 9, two generators at each end of the section, each being supplied from respective sets of transformers having different phases thereof reversed.

With either the single-phase or the polyphase system, it may be arranged that the two oscillation generators at the respective ends of the section oscillate on both positive and negative half-cycles of the line current, respectively, so that upon the occurrence of a fault the relay will be caused to operate by the beat note consequently established, when there is a shifting in phase between the currents in the two ends of the section due to a fault.

The invention is not limited to the arrangements and specific apparatus described, the scope of the invention being defined in the appended claims.

I claim as my invention:

1. An electrical protective system for a distribution circuit comprising means for super-imposing a plurality of different frequency currents upon the line current traversing said circuit, said means being responsive to the direction of the currents in different portions of the circuit, and means responsive to the superimposed currents for controlling said circuit.

2. An electrical protective system for a distribution circuit comprising an oscillation generator at each end of the circuit, said generators being of different relatively high frequencies, means whereby said generators superimpose currents on said line circuits during alternate half-cycles of the line currents at the respective ends of the line circuit and protective means for said circuit responsive to the beat frequency produced by said generators.

3. An electrical protective system for a section of a distribution circuit comprising an oscillating system at each end of the section including a thermionic device and means for deriving from the distribution circuit, at least a portion of the operating energy to operate the oscillating systems to super-impose high-frequency oscillations on the circuit, and characterized by the fact that the two systems are tuned to different frequencies to establish a resultant beat frequency, and means including a relay and a control circuit therefor tuned to the resultant beat frequency and operative upon a variation from said beat frequency to control the connections between the section and the distribution circuit.

4. An electrical protective system for a section of a distribution circuit comprising a high-frequency oscillation generator at each end of the section, both adjusted to super-impose oscillations of slightly differing frequencies upon the circuit to establish a resultant beat frequency, and responsive to the phase relationship and the polarity of the currents traversing both ends of the section to maintain normally the predetermined beat frequency and to vary such beat frequency upon the occurrence of a faulty condition causing a change in the polarity or the phase relationship between the currents, and a control relay responsive to the normal beat frequency and affected by variations therein to control the connections between the section and the distribution circuit.

5. An electrical protective system for an electrical distributing circuit comprising means constituting two oscillating circuits for super-imposing oscillations of different frequency upon each end of a section of the circuit to be protected, such oscillating circuits being energized from the distributing circuit and being directly responsive to the phase relationship between the currents traversing both ends of the section for controlling the frequency of the super-imposed oscillations, and means responsive to a pre-determined relationship between the super-imposed oscillations for controlling the connection between the section and the circuit.

6. Electrical protective equipment for a section of an electrical distribution system comprising means at one end of the section for super-imposing oscillations of one high frequency, similar means at the other end of the section for super-imposing oscillations of a different high frequency, both means being energized from the circuit and being responsive to the directions of the currents at both ends of the section and their relative phase relationship, and means normally restrained by the normal resultant beat frequency established by the two super-imposed frequencies but operative upon a variation from normal beat frequency, when the current direction or phase changes, to disconnect the section from the system.

7. Electrical protective equipment for a section of an electrical distribution system comprising means at each end of the section for super-imposing high-frequency oscillations of different periodicities on the section, said means being energized from the circuit and responsive to the directions of the currents at both ends or terminals of the sections and their relative phase relationship, and means responsive to the establishment, variation or elimination of the resultant beat frequency as either oscillation-producing means is affected by a change in the direction of the terminal currents or their phase relationship for controlling the connection of said section to said system.

8. Protective equipment for a section of an electrical distribution system comprising means at each end of the section for establishing a representative potential corresponding to the direction of the currents in the section at the associated ends, means responsive to such potentials for super-imposing high frequency oscillations upon the associated ends of the section to establish a normal beat frequency, and means responsive to an abnormal beat frequency caused by a variation in the relation between such representative potentials, upon the occurrence of abnormal conditions, for segregating said sections.

9. A protective system for a section of an electrical distributing system comprising a current transformer at each end of the section to be influenced by the current at that end of the section, and an oscillating system connected to each transformer and organized to produce high-frequency oscillations of different frequencies, means associated with each oscillating system for introducing the high-frequency oscillations into the section, and means responsive to the resultant effect of such oscillations for controlling the connection between the section and the remainder of the systems.

10. The combination with an electrical power system, of means for impressing oscillations at different ends of a section to be protected, and means responsive to the current in the section for synchronizing the periods of impression of such oscillations during normal conditions in the section.

11. Protective equipment for a section of an electric system comprising means for impressing oscillations on the section at each end thereof, means for normally synchronizing the periods of impression, and means responsive to a condition of non-synchronized periods for isolating the section.

12. In an electrical distributing system, the combination with switching means for isolating a section upon the occurrence of a faulty or abnormal condition therein, of means for impressing impulses on the section at each end thereof of a character other than that of the normal circuit current, means responsive to the normal circuit current for synchronizing the periods when the impulses are impressed, and means responsive to a predetermined non-synchronous condition of such impulses for isolating the section.

13. An electrical protective system for a distribution circuit comprising means responsive to the relative phase relation between line currents in different portions of the circuit for superimposing upon the line current a plurality of currents of frequencies different from each other and means responsive to the cooperative effects of the superimposed currents for controlling the circuit.

14. In a protective system of the type wherein circuit controlling means are controlled in accordance with the difference between the currents at the ends of a section of an electric circuit, means for controlling the circuit-controlling means at one end of the section comprising a device responsive to current in the circuit at that end of the section for transmitting between the ends of the section a carrier wave of a predetermined frequency and means for affecting said device in accordance with the current in the circuit at the other end of the section comprising means for transmitting between the ends of the section a carrier wave modulated in accordance with the current in the circuit at the other end of the section.

15. In an electric protective system, the combination with a conductor or line to be protected, of two oscillatory circuits disposed one at each end of the conductor and each adapted to generate periodic and normally simultaneous high frequency oscillations of different frequencies, the latter reacting to normally form a periodic beat note, and means responsive to a change in the beat note for controlling the line connections.

16. Protective apparatus for a line to be protected in an electric system, including circuit interrupters and actuating means therefor, oscillation generators associated with each end of the line energized by the line current to generate oscillations of different frequencies during predetermined portions of the cycles of the line current and reacting normally to form simultaneously a periodic beat note, and means responsive to a change in the normal beat note for controlling the circuit interrupters.

In testimony whereof, I have hereunto subscribed my name this nineteenth day of November, 1925.

NORMAN PULLEN HINTON.